(12) United States Patent
Korall et al.

(10) Patent No.: US 6,996,531 B2
(45) Date of Patent: Feb. 7, 2006

(54) AUTOMATED DATABASE ASSISTANCE USING A TELEPHONE FOR A SPEECH BASED OR TEXT BASED MULTIMEDIA COMMUNICATION MODE

(75) Inventors: Toby Korall, Herzlya (IL); Zeev Bregman, Tel Aviv (IL); Irit Ben Moshe, Nirit (IL); Miron Giladi, Shoham (IL)

(73) Assignee: Comverse Ltd., Tel Aviv (IL)

( * ) Notice: Subject to any disclaimer, the term of this patent is extended or adjusted under 35 U.S.C. 154(b) by 426 days.

(21) Appl. No.: 09/820,865

(22) Filed: Mar. 30, 2001

(65) Prior Publication Data

US 2002/0143548 A1    Oct. 3, 2002

(51) Int. Cl.
    *G10L 21/00* (2006.01)

(52) U.S. Cl. .................. 704/270; 704/270.1; 704/9; 704/235; 704/231; 704/251; 379/88.01; 455/412.1; 455/563

(58) Field of Classification Search .............. 704/9, 704/3, 275, 270, 251, 231, 235, 254, 260, 704/270.1; 707/3, 2, 4; 715/526; 379/88.18, 379/88.17, 90.01, 88.01, 88.1, 90.1; 455/412.1, 455/563
See application file for complete search history.

(56) References Cited

U.S. PATENT DOCUMENTS

| | | | | |
|---|---|---|---|---|
| 4,579,533 A | * | 4/1986 | Anderson et al. | 704/3 |
| 4,612,416 A | * | 9/1986 | Emerson et al. | 379/88.18 |
| 5,027,406 A | * | 6/1991 | Roberts et al. | 704/251 |
| 5,265,014 A | * | 11/1993 | Haddock et al. | 704/9 |
| 5,500,920 A | * | 3/1996 | Kupiec | 704/270.1 |
| 5,559,940 A | * | 9/1996 | Hutson | 715/526 |
| 5,583,965 A | * | 12/1996 | Douma et al. | 704/275 |
| 5,625,748 A | * | 4/1997 | McDonough et al. | 704/251 |
| 5,638,425 A | * | 6/1997 | Meador et al. | 704/251 |
| 5,878,423 A | * | 3/1999 | Anderson et al. | 379/88.17 |
| 5,924,070 A | * | 7/1999 | Ittycheriah et al. | 704/275 |
| 5,956,706 A | * | 9/1999 | Carey et al. | 707/2 |
| 5,999,595 A | * | 12/1999 | Shaffer et al. | 379/88.18 |
| 6,138,100 A | * | 10/2000 | Dutton et al. | 704/275 |
| 6,240,448 B1 | * | 5/2001 | Imielinski et al. | 379/90.01 |
| 6,438,523 B1 | * | 8/2002 | Oberteuffer et al. | 704/270 |
| 6,556,963 B1 | * | 4/2003 | Tetzlaff | 704/9 |
| 6,581,055 B1 | * | 6/2003 | Ziauddin et al. | 707/3 |
| 6,701,162 B1 | * | 3/2004 | Everett | 704/235 |

OTHER PUBLICATIONS

Casey et al DERWENT 1997-319358).*
Beyda et al (DERWENT 1999-083967).*
Casey et al. (DERWENT 1997-319358).*
Myers et al, ("Flexi-modal and multi-machine user interfaces", Multimodal Interfaces, Proceedings. Fourth IEEE International Conference on, Oct. 2002.*

(Continued)

*Primary Examiner*—Vijay Chawan
(74) *Attorney, Agent, or Firm*—Sughrue Mion, PLLC

(57) ABSTRACT

An interface for remote human input for reading a database, the interface including an automatic voice question unit for eliciting speech input, a speech recognition unit for recognizing human speech input, and a data recognition unit for recognizing remote data input. The interface is associated with a database to search the database using the recognized input. A typical application is as an automated directory enquiry service.

37 Claims, 4 Drawing Sheets

OTHER PUBLICATIONS

Rudnicky ("Matching the Input Mode to the Task", State of the Art; Pen and Voice Unite. Byte Magazine, Oct. 1993).*

Blattner ("In Our Image: Interface Design In The 1990s", This paper appears in Multimedia, IEEE, Spring 1994).*

McGee et al "Confirmation in Multimodal Systems", International Conference On Computational Linguisitics, 1998.*

Rudnicky '93 ("Mode Preference in a Simple Data-Retrieval Task", ARPA Human Language Technology Workshop, 1993).*

Finan et al ("Speech-Based Dialogue Design For Usability Assessment", IEE Colloquium on Interfaces—The Leading Edge, Digest No. 1996/126, Apr. 1996).*

* cited by examiner

AUTOMATED DATABASE ASSISTANCE USING A TELEPHONE FOR A SPEECH BASED OR TEXT BASED MULTIMEDIA COMMUNICATION MODE

FIELD OF THE INVENTION

The present invention relates to automated database assistance, particularly via telephone and more particularly, but not exclusively, to an automated directory assistance service.

BACKGROUND OF THE INVENTION

Directory assistance, and more generally, the interrogation of a database via a telephony device, is currently achieved by using telephone operators to manually input data received in voice form from a user for interrogation of the database. The use of manual operators is generally preferred because they are more adept at interpreting voice input from enquirers than is voice recognition software. For example, the voice input may be made in a variety of accents and may be made over better or worse connections, and under these circumstances manual operators are generally preferred.

Furthermore, a manual operator is able to judge whether or not a word has been heard correctly so as to decide whether to ask a user to repeat the word or to carry out a search on the basis of the presumed input. The manual operator is also able to start the search and then to ask the user to give further information until the search is completed, or to decide that the search cannot be completed. Automatic methods of obtaining voice data lack the flexibility for making effective decisions in obtaining data and using the data in the search.

The use of human operators is the largest cost element attendant in running a telephony-based database enquiry service. Generally, the call volume varies with the time of day, with notable peak times. The use of human operators therefore requires considerable scheduling in order to meet peak demand.

Generally, a basic directory enquiry service is mandated by a telecommunications regulator, and value-added variations or improvements on the basic service may be provided as premium level services by the telecommunication service operator or by others.

Two particular known systems that address the above-mentioned problems include: (1) a rerouting system that routes calls to other call centers at peak times, and (2) an automation system that uses an automatic dialogue to obtain information from the caller. In the automation system, the recorded information is played back to an operator who may immediately initiate the search.

A further approach is to be described in U.S. Pat. No. 5,638,425, Meador et al, entitled "Automated Directory Assistance System Using Word Recognition and Phoneme Processing Method", the contents of which are herein incorporated by reference. The patent discloses a mechanized directory assistance system for use in a telecommunications network, which includes multiple speech recognition devices comprising a word recognition device, a phoneme recognition device, and an alphabet recognition device. The system also includes a voice processing unit, and a computer operating under stored program control. A database is utilized which may comprise the same database as used for operator directory assistance. The directory assistance system operates as follows: A directory assistance caller is prompted to speak the city or location desired. The response is digitized and simultaneously inputted to the word and phoneme recognition devices, each of which outputs a translation signal plus a probability level signal. The probability level signals are compared and the highest probability level translation is selected. The caller is then prompted to speak the name of the sought party. The response is processed in the same manner as the location word. In the event that the probability level fails to meet a predetermined standard, the caller is prompted to spell all or part of the location and/or name. The resulting signal is inputted to the alphabet device. When translations are obtained having a satisfactory probability level the database is accessed. If plural listings are located from the database, then these listings are articulated and the caller is prompted to respond affirmatively or negatively to each listing. When a single directory number has been located, a signal is transmitted to the caller to articulate this number. The system also allows DTMF keyboard input in connection with the spelling procedure.

SUMMARY OF THE INVENTION

To solve the above-described problem of being forced to use a human operator, it is an aspect of the present invention to provide a way to automatically search databases remotely using remote contact devices, irrespective of whether such remote contact devices are designed for text based communication or speech-based communication. An interface consistent with the first aspect of the present invention has an automatic question unit operable to determine whether a user is connected via a voice-based or a text-based or a combined voice-text capable communication link.

Based on this determination, this automatic question unit, also, elicits input from a user via voice or text based communication. This interface further has a speech recognition unit for recognizing human speech input, a data recognition unit for recognizing remote data input, and a query formulation unit operable for both formulating a searchable query from said recognized input and for prompting said automatic question unit to elicit further input from a user. This interface is associated with a database to search this database using recognized input.

Furthermore, a location system consistent with a second aspect of the present invention is connectable to a location database with a geographic location data associated with personal identification data such that the personal identification data is usable in search queries to obtain an associated location. The location system further has a positioner for determining a current position of an enquirer. This location system can receive location data from the database in response to a query involving personal identification data. Moreover, the location system has a route determiner for determining a route from the current position to the desired location using location data.

Moreover, a method consistent with a third aspect of the present invention determines whether a user is connected via a voice-based or a text-based or a combined voice-text capable communication link; then, elicits input from a user via either voice or text based communication according to the connection type. Then the speech or text input is recognized and a searchable query from said recognized input is formulated. Next, the user is prompted via automatic questioning in order to elicit further user input unless a query was sufficient for searching the database has been formulated. Finally database is searched using the query.

Finally, a method consistent with a fourth aspect of the present invention provides entering a query request via remote communication device in a communication mode, sending the query request to a communication interface in this communication mode, receiving instructions in this communication mode for entering query items to form a database search query, sending the query items in this communication mode for said interface to form a query for interrogating said database in a database interrogation mode to produce a query result in said database interrogation mode for translation by the interface into this communication mode, and receiving the result at the remote communication device from an interface in this communication mode.

BRIEF DESCRIPTION OF THE DRAWINGS

For a better understanding of the invention and to show how the same may be carried into effect, reference will now be made, purely by way of example, to the accompanying drawings, in which.

DESCRIPTION OF THE PREFERRED EMBODIMENT

Figure 1:
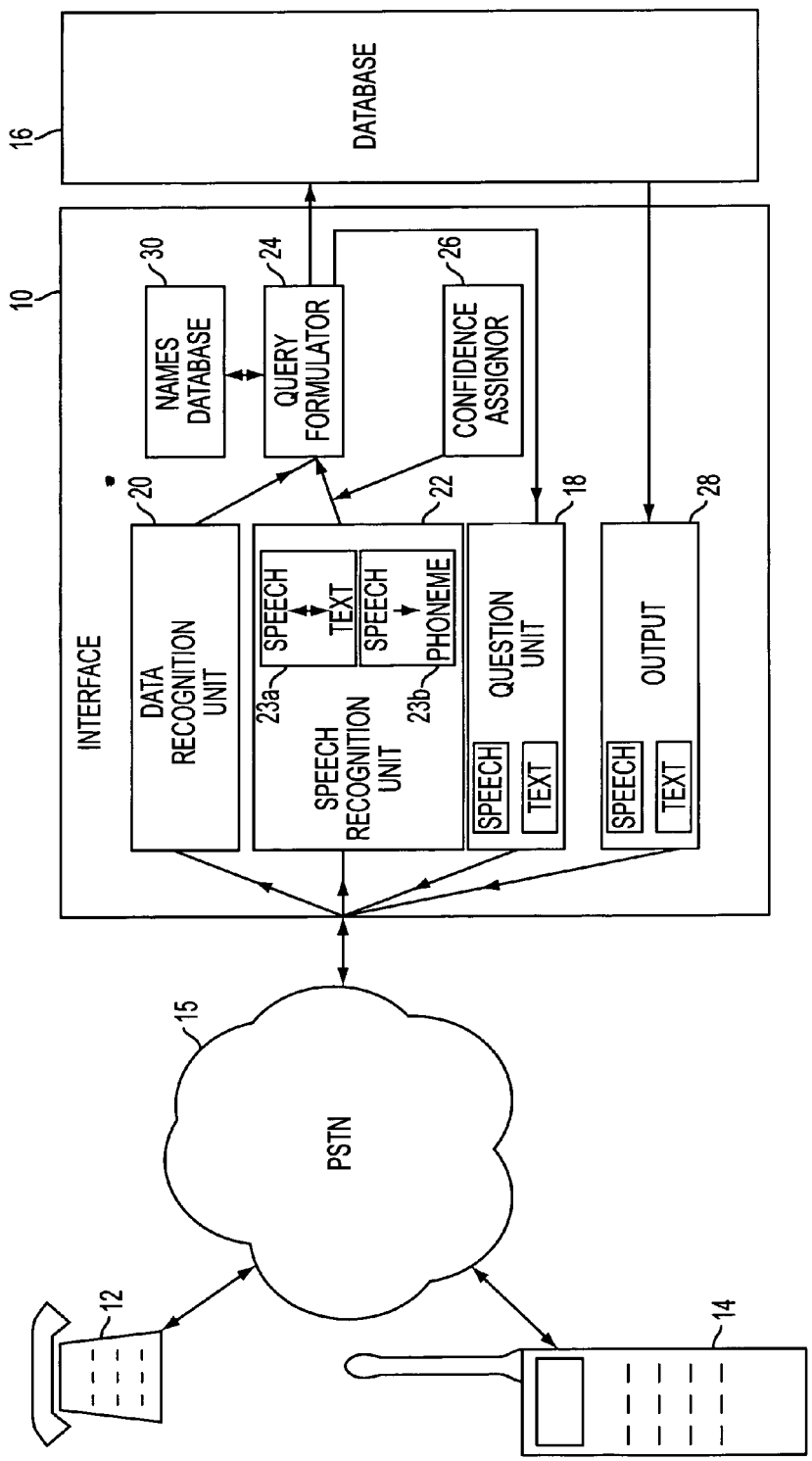
FIG. 1 is a block diagram showing an automatic interface between a remote user and a database, which interface is operable to search a database using queries formulated on the basis of information gathered over a telephony link from a remote user.

Before explaining at least one embodiment of the invention in detail, it is to be understood that the invention is not limited in its application to the details of construction and the arrangement of the components set forth in the following description or illustrated in the drawings. The invention is applicable to other embodiments, and is able to be practiced and carried out in various ways. Also, it is to be understood that the phraseology and terminology employed herein is for the purpose of description and should not be regarded as limiting.

Reference is now made to FIG. 1, which is a block diagram showing an automatic interface between a remote user and a database, which interface is operable to search a database using queries formulated on the basis of information gathered over a telephony link from a remote user. Thus a remote user is enabled to use whatever facilities are available or most convenient on his telephony device, to obtain data from the database.

An interface 10 receives input from remotely located telephony devices 12 and 14 via the public switched telephone network (PSTN) 15. Data received from the remote telephony devices is most likely to be in voice form but may also be in the form of data input via a keyboard. Such data may typically be transferred over the PSTN 15 as DTMF tones but possibly also as digital data, depending on the communication device. If the Internet, or like data based communication network is used then the data is preferably transmitted as is.

The data input from the user is intended to elicit information and thus preferably comprises query material which may be made to correspond to one or more searchable fields of an associated database. To obtain user input in a way that can be inserted into a database, the interface preferably comprises an automatic question unit 18 for asking questions of the user with the aim of obtaining the data in a structured manner. The interface is able to determine whether the user is communicating via voice or text, preferably simply by analyzing the initial input of the user initiating the search procedure, alternatively by analyzing a handshake procedure used to set up the channel. The skilled person will be aware of other ways of carrying out such a determination. If the user is using voice communication then the question unit 18 preferably communicates using voice. The questions may thus be prerecorded or they may be formulated afresh and spoken by a speech synthesis unit. If the user is using text based communication then text based versions of the questions may simply be sent to the user as text messages.

In many telephony devices, voice is the only way in which data can be received. Relatively few devices for example have a screen for displaying data. On the other hand, all telephony devices have a keyboard of some kind and keyboards can be used to provide textual input. Nevertheless the telephone keyboard is rarely a full keyboard and generally speech is the easiest way to send information from such a device. Thus the interface as illustrated has both a data recognition unit 20 and a speech recognition unit 22 so that it is able to recognize any kind of input that is likely to be sent from a telephony-enabled device.

Returning to the automatic question unit and selection of questions, and as mentioned above, the questions are intended to obtain specific responses from a user in such a way that they can be related to individual searchable fields in the database. The questions are preferably hierarchically arranged in terms of more important and less important fields so that more important fields are filled first. Thus, if the important fields are successfully filled, remaining less important fields can be ignored, being used only if an initial search based on the important fields is unsuccessful. Such a hierarchical arrangement reduces the total number of questions asked and leads to more efficient searches.

Where the input is textual, the data recognition unit 20 is initially informed by the Interface 10 that textual information is being received and then interprets the received information in relation to the individual fields in the database 16. The data recognition unit 20 is preferably capable of recognizing DTMF tones. In general, speech and data connections can be distinguished by the interface inter alia on the basis of a connection handshake procedure used to set up the connection, as mentioned above.

The speech recognition unit 22 is preferably informed by the Interface 10 that incoming data is in the form of speech, and then interprets the speech in terms of the searchable fields in the database 16, as will be explained in more detail below. As mentioned above, the interface may inter alia determine the presence of speech data from a handshake or call setup procedure, which is generally carried out differently for setting up voice or data links.

The interface 10 preferably further comprises a query formulator 24 which arranges the information identified by the recognition units 20 and 22 in terms of database fields in order to form queries for interrogating the database. The query formulator takes information received from the enquirer and arranges it fieldwise to form a query. For example it may take data received in response to a question about the surname and data received in response to a question about an initial and may form them into a query of the form 'surname+initial', which query can be applied to a search engine for interrogating the database.

The query may be submitted once a threshold number of fields have been filled in. In a preferred embodiment the threshold number of fields is a function of the size of the database. In a further preferred embodiment the threshold may be a function, not just of the number of fields filled in but also the degree of certainty within those fields. That is to say, since data received from speech is not necessarily unambiguously recognized, a strength level of the query may be adjudged from the level of certainty in the fields as well as the number of fields filled in. Only queries whose strength level exceeds the threshold are submitted to the database.

If the query leads to an unambiguous query result from the database then the unambiguous result is output from the database 16 to an output unit 28 which sends the data to the remote enquirer. Preferably, if the result is not ambiguous, the user is asked further questions by the voice question unit 18 so as to be able to use further searchable fields of the database in an improved query. To this end the automatic voice question unit 18 is programmable with a plurality of questions arranged as a hierarchy, meaning that the questions are arranged for making optimal use of the database structure. Thus, a field that is always crucial in a search is requested early on. A field that is mostly useful in resolving between already retrieved results is asked later on. Again, fields may also be arranged in accordance with the way in which the enquirer is likely to relate to the query. For example a user is likely to input a first name before a family name even though the family name is generally the more important search field.

In a preferred embodiment the size of the database is taken into account in deciding how many fields are requested from the user before initial submission of the query. For example a small database having just a few thousand names would probably be able to process the vast majority of queries on the basis of a family name alone. Thus a number of questions to be asked initially is determined according to the size of the database and according to the quantity of information likely to be needed to resolve the average query. This is particularly helpful since users are not likely to be comfortable using a system that asks them large numbers of questions to obtain relatively little information.

Preferably, if a predetermined hierarchy of questions is exhausted without a search being satisfactorily completed, or if information obtained from the user cannot be translated into data usable for the search, or if the user requires it specifically, then the user is transferred to a human operator.

In one embodiment, the speech recognition unit 22 comprises a speech to text converter. Correspondingly, the database 16 comprises text entries and is searchable using the output of the speech to text converter when processed by the query formulator. The speech to text converter is known in the prior art, and in particular is discussed in U.S. patent application Ser. No. 5,638,425 referred to above.

In another embodiment, the speech recognition unit 22 comprises a speech to phoneme converter. Correspondingly, the query is made up from the resulting phonemes, the database 16 comprises entries made up of groups of one or more phonemes, and database searching involves the matching of phonemes to arrive at a search result giving a required database entry. The speech to phoneme converter is known in the prior art, and in particular is discussed in U.S. patent application Ser. No. 5,638,425 referred to above.

Speaker independent speech recognition hardware that can be used in the above-mentioned embodiments is available as a range of processor chips from Sensory, Inc. 1991 Russell AvenueSanta Clara, Calif. 95054-2035, USA. Text regognition hardware is also available from the same source.

In a particularly preferred embodiment, as illustrated in FIG. 1, the speech recognition unit 22 includes both a speech to text converter 23a and speech to phoneme converter 23b. The database may correspondingly comprise searchable fields stored in both text and phoneme format. In one possible mode of operation the interface 10 may select for the query whichever of the text or phoneme output has been assigned a higher level of confidence by the confidence assignor 26 for use in the search. In another mode of operation the interface may use both text and phoneme based queries in the search.

Preferably, the interface comprises a confidence assignor 26. The assigner is preferably associated with the speech to text converter or speech to phoneme converter referred to above. In general, when converting speech, pattern matching or like techniques are used to match the incoming sound to templates and the template giving the closest match is recognized as corresponding to the input. However, absolute measures of the accuracy of the match may be available from the matching process and these can be used to associate any given result with a confidence level. For example, a cross-correlation may be used to determine a match between an input waveform and each of a series of templates. The template giving the highest cross-correlation is selected and the level of the cross-correlation function may then be used to provide a level of confidence to the match. The level of confidence can then be Consequently, the output unit is preferably able to deliver output in the form of speech. In addition, the output unit 28 may provide output in the form of text for those users connected via a device able to display text (including output in form of fax and email). In the particular application of an automated directory enquiry service, the output unit may additionally provide the user with the ability of dialing a telephone number obtained as a result of the enquiry.

The interface 10 is preferably interfaceable to a specific mobile telephone data facility such as WAP. WAP allows the user to connect via the Internet and carry out a search textually. Furthermore, a WAP interface can allow a user to speak his input into the phone and may allow spoken output to be given to the user.

Additionally or alternatively to WAP, the service may be interfaceable to an instant messaging service. Thus the data recognition unit 20 preferably receives a message initiating a query and, in response, sends a reply comprising a first one of a hierarchy of questions appropriate to the data fields to be searched. The query formulator 26 receives the user's responses and builds them into a query which is submitted to the database 16 as soon as sufficient information is judged to be available.

In applications involving name-based searching, it is widely appreciated that individual names do not exist in isolation but rather come with different spellings, or in shorter and longer versions. In particular, first names are often associated with nicknames and in addition, may appear in a database either used by the interface 10, for example to make decisions about repeating questions or referring the user to a human operator.

Thus, preferably, the interface is operable to submit an input obtained in the form of speech to formulate a query for searching the database 16. In the event of a failure to produce an unambiguous result from the database 16, or in the event of failure to match text or phoneme templates to the speech input or in the event of a match of text or phoneme templates but at a low level of confidence, the voice question unit is further operable to ask a user to spell the input. In the case of spelling an input, then at least in the case of the English keyboard, there are only 26 possible results that have to be considered, and if taking into account the full alphanumeric character set then there are 36 possible results. These 26 or 36 results generally have relatively large distances between them, and so the possibility for error or confusion is reduced. The skilled person will appreciate that the number of results will be different for non-English language character sets.

The interface preferably comprises output unit 28 for outputting a search result. Preferably, the output unit comprises speech and text output capabilities and a selector for selecting an output capability to be used based on a user data receipt ability, preferably determined by the interface 10. In general, set up sequences for communication links are entirely different for data and voice links and the interface is able to determine from the setup procedure how to set the selector. spelled out in full or appearing as initials. Often, when considering a database such as a telephone directory, a first name being used in the query may appear in the database only after a spouse's first name. For example the enquirer may be asking about Anne Jones. But Anne Jones may appear in the database as Jones A, or as Jones, Michael and Anne. Likewise Michael Jones may appear in the database as Jones, M or as Jones, Mike or as Jones, Michael.

Thus, in one embodiment of the present invention the interface includes a names database 30 defining associations, or associative linkage, between names, and a search query is built up based on the name given by the user together with associated entries in the names database 30. The names database preferably comprises associations between entries comprising different ways in which a given query name may be expected to appear in the database 16, alternative spellings, nicknames etc. and including common mistakes.

As mentioned above, a particularly preferred embodiment of the present invention is an automated directory enquiry service, in which case the database 16 is a contact directory giving at least one contact point, such as a telephone number, for each one of a plurality of searchable entries such as subscribers to the telephone company associated with the database 16.

In such a database, the individual subscriber may have more than one contact point listed, perhaps a home telephone number, a fax number, a mobile telephone number, an office telephone number, an e-mail address and home/office address. These different types of contact points may be arranged in a hierarchy so that an enquirer is always given one of the contact points first unless he specifies one of them in particular. In a preferred embodiment, the system uses the retrieved contact point to dial and contact the subscriber at the request of the enquirer. In a preferred embodiment the system tries the contact points in order, down the hierarchy (or even simultaneously) until the subscriber is contacted. In another embodiment, the enquirer may set his own hierarchy of contact point types for contacting others and in another embodiment the subscriber may set a hierarchy of his own contact points for the system to use when attempting to contact him. Furthermore the subscriber may set his hierarchy to change during the day. For example, knowing that he is generally in the office at certain hours, traveling at certain hours and at home at other times, he may choose to set the relevant contact points to be at the top of the hierarchy at the respective times. For example he may set his office number to be at the top of the hierarchy between 9 AM and 5 PM and his home number to be at the top of the hierarchy between 6 PM and 8 AM with his mobile number at the top of the hierarchy at all other times.

The setting of the hierarchy is preferably carried out using a programming interface, again using voice and text communication as appropriate to the user's method of connection.

In a further embodiment, a contact point, such as a phone number, is usable as an input to obtain other details of a subscriber. Preferably, such a feature is provided only with the approval of the individual subscriber.

An automated directory assistance package according to a preferred embodiment of the present invention carries out an initial dialogue with the enquirer, for example by asking him first1 for the name of a town or otherwise for information that will allow the system to identify one of a plurality of databases or database parts to be used in a later search. Once a database, or database part, or directory, has been identified, the enquirer may then be asked for a family name and a postcode. If sufficient information is now available to arrive at a final result then the system will read the resulting number to the enquirer and/or ask the enquirer if he would like to be connected automatically to the number. If the search does not give a final result, for example there is more than one person with the same family name in the same postcode, the system will ask the enquirer for further information such as a first name or initial. The user may answer the question, or request that the system pass on to a further question. Likewise if the answer still does not permit a final result, then the enquirer may be asked for a street address.

If the information given at any stage cannot be resolved into either text or phonemes, then the enquirer is preferably asked to spell the information he is giving. If the information still cannot be resolved, whether because it cannot be effectively converted into text or phonemes, or because all the questions have been asked and a single search result has not been arrived at, the enquirer is preferably passed to a human operator.

Preferably, the system does not ask the user questions that are not helpful in resolving the search. For example, if, using just a family name, a number of search results are obtained that differ in the street address but not in the first name or initial, the enquirer is preferably asked only about the street address, and the question about the first name or initial is skipped as being superfluous. Likewise, if the entries found differ only by first name then the user may be asked as a supplementary question to specify the first name. Similarly, if the entries found differ in the spelling of the family name (it will be recalled that searches are preferably carried out over all associated spellings of the same name) then the user may be asked, as a supplementary question, to spell the family name.

Thus, in most enquiries, the majority of available questions are not asked because searching and asking questions are carried out in a single integrated process that is aimed at distinguishing between search results and is preferably terminated when an unambiguous result is obtained.

The skilled person will be aware that the directory need not be restricted to private subscribers as in the traditional white pages telephone directory. The directory may equally well encompass business or commercial directories or any other kind of searchable database that may require remote interrogation. In all of these cases the directory is treated as a database and operation is identical.

Preferably, if the directory is sufficiently large, (several million entries) such that even uncommon family names are likely to appear several times, the street address may be asked as part of the initial information prior to beginning the search. On the other hand, if the directory is relatively small, (a few hundred thousand entries) then only the name and the postcode is preferably asked.

In one preferred embodiment, the search results may be sent via the output 28 to an enquirer using a mobile telephone messaging feature such as SMS. This has the advantage of the user being able to store it in the telephone internal memory or in a personal address book.

Preferably, features are provided allowing the enquirer to be passed on to a human operator at any time, to ask for additional numbers, and, where a subscriber entry contains several telephone numbers, to try each one in turn in accordance with a predefined hierarchy until the subscriber is reached. Connection to the subscriber can also be done automatically in a serial or parallel way without user intervention as described earlier Preferably, automatic transfer to a human operator is also provided when a search fails to find any matches or when the line is too noisy to allow speech recognition, or for example when the number/subscriber data is classified. A case of high line noise may be inferred from a series of low confidence matches or from direct measurement of noise on the incoming line.

In a preferred embodiment, transfer to a human operator includes playing back to the human operator the answers that the enquirer has already given to the automatic system.

Automatic connection to the number retrieved may be carried out under the supervision of a call center, in which the call center handles issues such as failure to complete the call. As an alternative, the number may simply be dialed and the enquirer left to himself.

The coverage of the enquiry service need not be restricted to any geographic region or to the subscribers of any given telephone company. The enquiry service is restricted only by the availability of databases. In providing databases, it is possible to use a strategy of searching a single large database or to use several smaller databases, segmentation of the data being carried out, for example, according to geographical information. The data in the database need not be restricted to search fields and telephone numbers. E-mail addresses and like information may also be included. An individual database may be a company-specific database and may thus include information such as department or other organizational information.

In a further preferred embodiment of the present invention, a personal address book feature is provided. In this embodiment, entries retrieved for a given enquirer are stored in the personal address book for retrieval later on by that enquirer, so that he does not need to request the same information again. For example, the retrieved entries may be stored in the portable phone 14 as a personal address book feature. Storage of the data by the enquirer may be automatic, meaning that the system is set up to store the results of any enquiry in such a personal address book. Alternatively, storage may be on demand, in that the enquirer may explicitly request the data to be stored. As well as the dialogue-based interface, the system is also able to use the WAP interface or any other telephone-data interface. The enquirer input may be sent as text via the WAP interface, or as speech or via SMS, and, as before, the results may be sent as any one of the three (or as fax, email, or any other available format). Data sent as text may then be displayed on a screen.

The system can be used to provide what is known as reverse searching, that is, searching using the telephone number or like result field as the search field. An application of reverse searching is to identify the senders of incoming calls or messages. Thus, instead of displaying a telephone number on the screen it is possible to display a sender name. In a particularly preferred embodiment, a database of photographs and or video and or audio clips may be used and the reverse search facility may locate and display the retrieved photograph or video or audio clip or a combination thereof of the retrieved sender. In another embodiment, to be described in greater detail below, the reverse output of the directory may be inserted as a header of a voicemail message, so as to automatically provide voicemail messages with clear identification of the sender.

In a further preferred embodiment, a database of the kind described above may be associated with a location system. There are currently available location systems which comprise street maps and can be incorporated into vehicles to guide a user to a destination. Such systems may include GPS operability so that the current location of the user can be compared to a desired location so as to give the user a route to the desired location. In the present embodiment, the system is combined with a database such that the enquirer gives the name or other identification information, the database obtains an address and the location system advises on a best route to reach the address. Advice on the best route may be given as spoken instructions or as written data or as a path displayed on a map screen as appropriate for the device through which the enquiry is made or to which the enquiry result is sent. Preferably, the same spoken/written instructions are stored in several languages and the user is able to select the desired language. Alternatively, upon user selecting the desired language, instructions are translated from the base language into this desired language.

Figure 2:
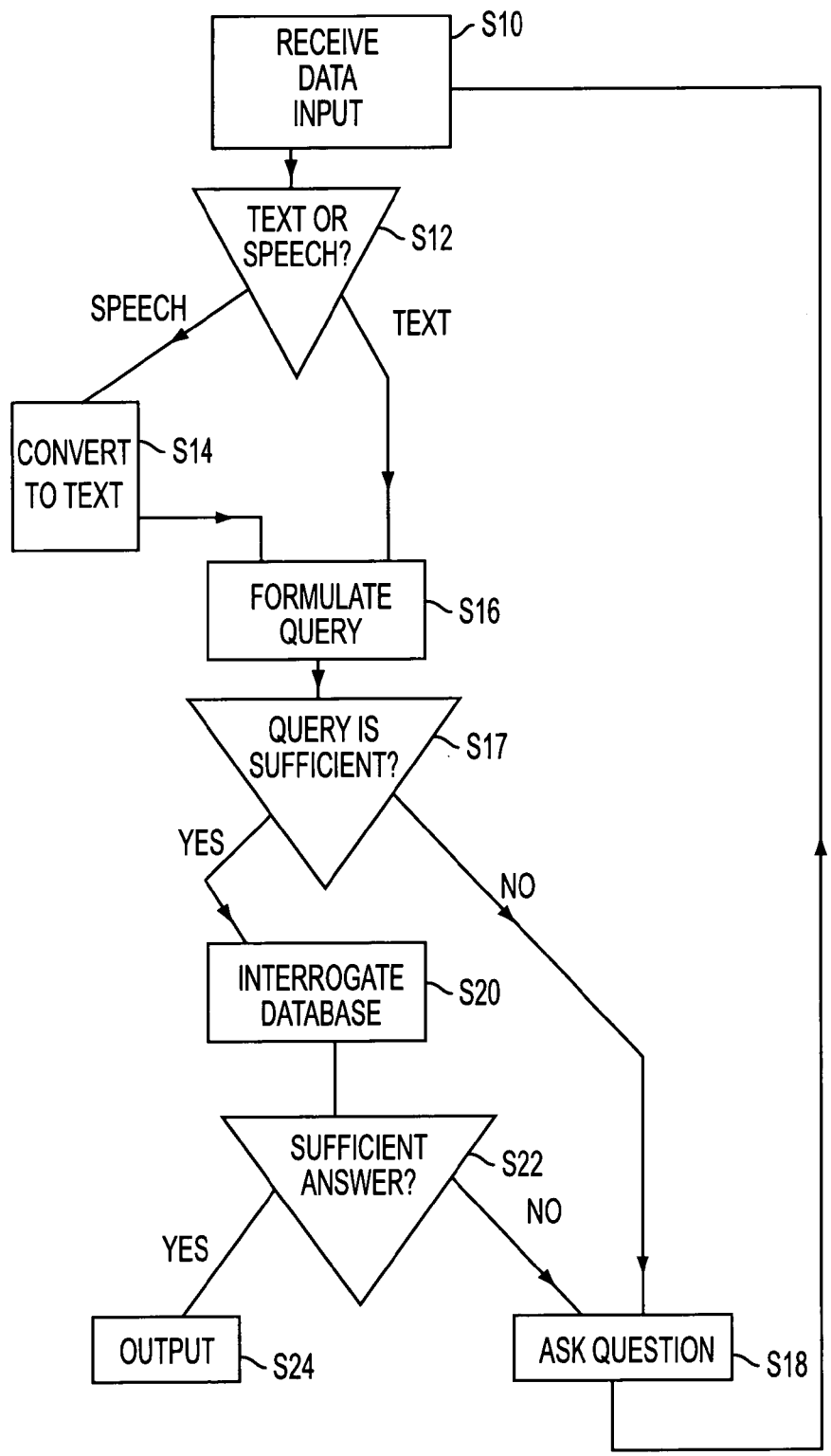
FIG. 2 is a flow chart showing operation of the interface of FIG. 1.

Reference is now made to FIG. 2, which is a flow diagram showing in greater detail the way in which an incoming user enquiry is processed to produce a query for the database and a usable output for the user. In FIG. 2, in an initial stage S10 data input is received from the user. The system determines whether the incoming data is text or speech in a decision stage S12. If the data is found to be speech then it is preferably converted to text in a conversion stage S14. As discussed above the speech may alternatively or additionally be converted into phonemes. The resulting text or phonemes may then be formulated into a query in a stage S16. The number of fields are then used to determine, in determination stage S17, whether the query is sufficiently strong to obtain a useful result. If not, further data is obtained by asking a further question of the enquirer in a stage S18. If the data is judged to be sufficient then it is used to query the database in stage S20. If the database does not give a sufficient output in determination stage S22, then the procedure continues to S18 and asks the user a further question, preferably judiciously chosen to enable the system to discriminate between multiple search results. Once a sufficient answer is available the system outputs an answer to the user in output stage S24.

Figure 3:
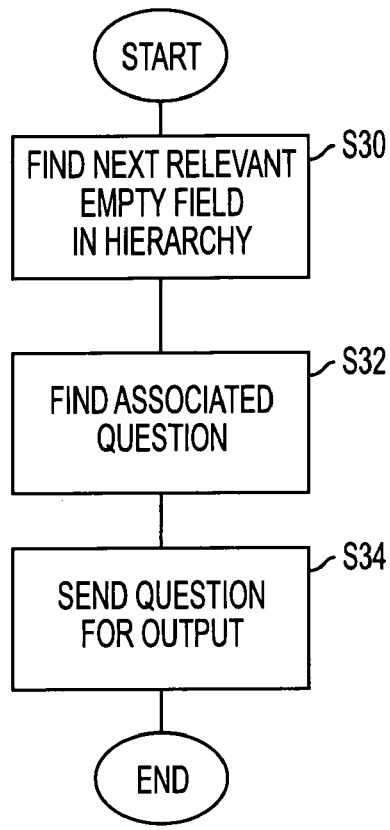
FIG. 3 is a flow chart showing in greater detail the selection of a further question in the operation of FIG. 2.

Reference is now made to FIG. 3, which is a flow chart showing in more detail the procedure of S18 in FIG. 2, namely that of determining a further question to ask. The database 16, and likewise the associated query, is preferably divided into a series of fields each containing a different part of the information that identifies the subscriber, each part being possible to be associated with a different question. Preferably, as discussed above, the questions are arranged in a hierarchy so that information more critical to the search is entered early on during the query formulation process. For example a family name field is more critical in searching a directory than say a street number field. In addition, natural human usage is taken into account in arranging the hierarchy, again, as discussed above. The procedure of stage 18 determines a further question to ask by noting which fields in the query being formulated currently contain information and then determining which is the next empty field in the hierarchy. A question associated with the next empty field is then selected and asked. For example, the database may comprise the following fields in hierarchical order, surname, first initial, second initial, street address, zip code. If the surname has already been obtained then the next field in the hierarchy is the first initial field. A question asking the user for the first initial is thus selected and asked.

Previously retrieved but incomplete results from the database are also used as operands in the procedure if available. In a stage S30 a next empty field in the hierarchy is obtained. If current but incomplete results are available then it is determined whether filling in the next empty field will assist in being able to complete the search. For example if the next empty field is the first name, and the currently retrieved results comprise two candidate results that do not differ in the first name field, then the field is skipped and the following empty field is proceeded to until a relevant field is found for which asking a question is worthwhile.

A question associated with the relevant empty field is then selected in stage S32. For example, if the field is the street address then the question selected may be "What is the required street address". In stage S34 the question is preferably sent for output to the enquirer. As discussed in detail above, the enquiry may be a voice or a text enquiry and the question will thus be sent for output in the appropriate format.

Figure 4:
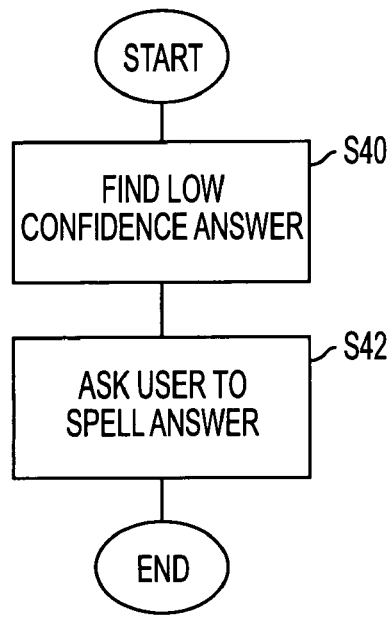
FIG. 4 is a flow chart showing in greater detail the selection of a further question in the event of low probability recognition of user input.

Reference is now made to FIG. 4, which is a flow diagram explaining operation in the event of a user response being recognized with a low level of confidence. A threshold confidence level is preferably set such that in a stage S40 a low confidence recognition can be identified. In such a case a question is preferably output requesting the user to spell his response in a stage S42.

Figure 5:
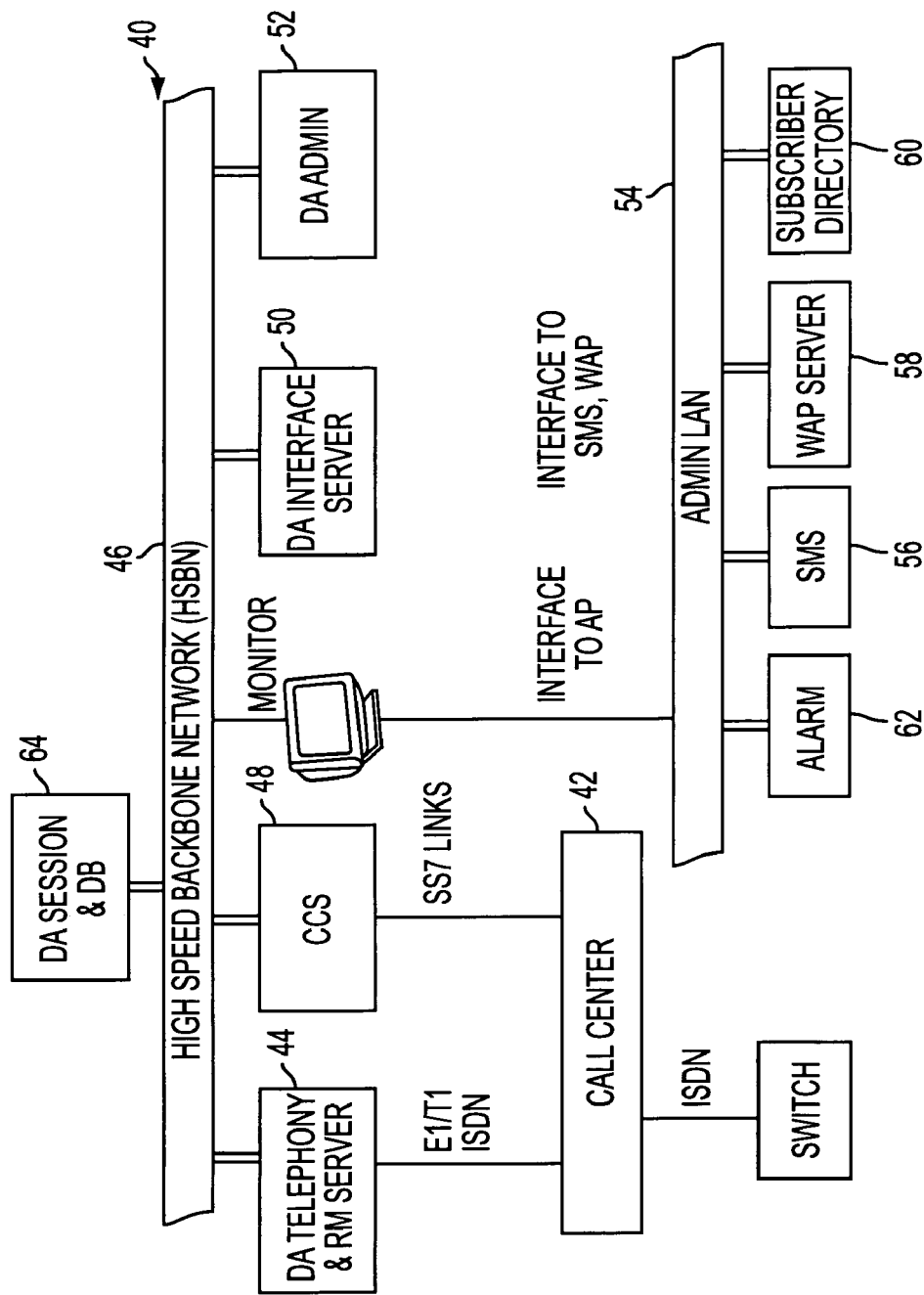
FIG. 5 is a block diagram of an architecture for supporting automatic directory assistance, in accordance with a preferred embodiment of the present invention.

Reference is now made to FIG. 5, which is a block diagram of a directory assistance architecture 40 for supporting the automatic directory assistance system, in accordance with a preferred embodiment of the present invention. The block diagram is by way of an example only and illustrates an embodiment of the invention applied specifically to a node of a high speed backbone network 46, the node using El/Ti and SS7 signaling. In FIG. 5, the architecture 40 comprises a standard call center 42 fronted by a front end unit 44, preferably a directory assistance telephony and RM server 44 attached directly to the high speed backbone network (HSBN) 46 of the telephone network. Also connected to the HSBN are a call control signaling (CCS) unit 48, a directory assistance interface server 50, a directory access administration server 52, and an administrative LAN 54 to which are attached interface servers to SMS 56 and to WAP 58 and the subscriber directory 60. An alarm 62 is also attached to the administrative LAN 54 and preferably administers all the alarms on the system.

The CCS unit 48 is optional and preferably handles the SS7 call control signaling referred to above.

The DA telephone and RM server 44 is a front end unit of the directory assistance architecture 40. The front end unit interfaces to the telephony system and for example stores or caches voice prompts. Additionally it may comprise text to speech software to provide voice prompts as necessary. Each front end server 44 is associated with at least one, preferably more than one, back end unit, here indicated as a DA session and DB unit 64 and the front end server 44 preferably carries out resource management tasks therefor. The DA interface server 50 operates the WAP interface 58, SMS interface 56 and any other interfaces to external systems that may be included. The DA telephone and RM server 44 preferably takes the results of the directory assistance session to complete the call, that is to say make the connection, for the enquirer.

DA session and DB unit 64 preferably carries out handling of the directory assistant dialog session and the database search session as explained above in respect of FIG. 1.

The DA interface server 50 preferably serves to send SMS messages via TCP/IP to the SMS server 56 and WAP messages to the WAP server 58.

The DA administration unit 52 is a supervisory and programming unit, preferably used to set up, manage and reprogram the system. For example, new dialog would be entered via DA administration unit 52.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. An interface for remote user input for reading a database, the interface comprising:
   an automatic question unit operable to determine whether a user is connected via a voice-based or a text-based communication link, and for eliciting remote input from a user in accordance with said determination;
   a speech recognition unit for recognizing a human speech input;
   a data recognition unit for recognizing a remote data input; and
   a query formulation unit, coupled to said speech and data units, and operable both for formulating a searchable query from a recognized input by at least one of said speech and data recognition units, and for prompting said automatic question unit to elicit from the user additional input related to formulating the searchable query;
   and wherein the interface is associated with a database to search said database using said recognized input.

2. An interface according to claim 1, wherein said speech recognition unit comprises a speech-to-text converter operable to convert a user speech input into query information for said database, and wherein said database comprises text entries.

3. An interface according to claim 1, wherein said speech recognition unit comprises a speech-to-phoneme converter operable to convert a user speech input into query information for said database, and wherein said database comprises entries made up of groups of one or more phonemes.

4. An interface according to claim 1, wherein said speech recognition unit comprises a combined speech-to-text converter and speech-to-phoneme converter, operable to convert a user input into query information for said database.

5. An interface according to claim 1, further comprising a confidence level determiner, associated with said speech recognition unit, said determiner being operable to determine a level of confidence of an output of said speech recognition unit.

6. An interface according to claim 1, further comprising an output unit for outputting a search result, wherein said output unit is operable to provide speech and text outputs, and a selector for selecting one of the speech and text outputs based on a user's data receipt ability.

7. An interface according to claim 6, wherein the interface is interfaceable to a mobile telephone data facility.

8. An interface according to claim 7, wherein said mobile telephone data facility is one of a WEB, WAP, plain text and SMS.

9. An interface according to claim 6, wherein the interface is interfaceable to a messaging service.

10. An interface according to claim 1, wherein said query formulation unit is operable to submit a recognized speech input as a query to search said database and, in the event of failure to obtain a match in said database, is further operable to prompt said automatic question unit to ask the user to spell said recognized speech input.

11. An interface according to claim 10, further comprising associative linkage between associated names for widening searches on the basis of variations of input names.

12. An interface according to claim 10, wherein said database is a contact directory having at least one contact point for each of a plurality of searchable database entries.

13. An interface according to claim 12, wherein, for any searchable database entry having more than one contact point, a hierarchy of contact point types is provided to define which of said contact points to output first.

14. An interface according to claim 12, wherein a contact point is usable as an input to obtain a searchable database entry.

15. An interface according to claim 14, further operable to insert an identification of a caller into a header of a message left by said caller.

16. An interface according to claim 15, wherein said identification is one of a text string, a photograph, an audio sequence and a video sequence.

17. An interface according to claim 14 wherein said contact point is a telephone number.

18. An interface according to claim 12, further comprising a switch for connecting a user to a contact point retrieved from said database.

19. An interface according to claim 1, wherein said automatic voice question unit is programmable with a plurality of questions as a function of the size of the database.

20. An interface according to claim 19, wherein said questions are storable in a hierarchy which corresponds to a predetermined search strategy for the database, and wherein said automatic voice question unit is operable to stop asking questions as soon as sufficient information has been obtained to terminate a database search.

21. An interface according to claim 20, wherein the interface is operable to connect a user to a human operator when said hierarchy of questions has ended and a database search has not been terminated.

22. An interface according to claim 20, wherein the interface is operable to connect a user to a human operator when a user input is not translatable into information usable for searching said database.

23. An interface according to claim 1, further comprising a confidence level determiner, associated with said speech recognition unit, and operable to determine a level of confidence for a recognition instance of said speech recognition unit, said confidence level determiner being further operable to connect a user to a human operator when a user input is associated with a confidence level lower that is less than a predetermined confidence threshold.

24. An interface according to claim 1, further comprising a data exchange mechanism operable to bring about data interactivity between said database and a remotely located user database.

25. An interface according to claim 1, wherein said database is searchable to retrieve a location, and wherein said retrieved location is superimposable on one of a map, a video and a photograph.

26. An interface according to claim 25, further comprising a graphical output unit operable to send said map to said user.

27. An interface according to claim 25, wherein said map is in a location system operable to determine a current location of a user, said location system is operable to trace a route from said current location to said retrieved location.

28. An interface according to claim 1, wherein said database comprises results fields including one of a text string field, a photograph field and a video sequence field.

29. An interface according to claim 1, wherein said question unit comprises a speech output operable to output questions in spoken form to users connected via speech-enabled devices and a text output to output questions in text form to users connected via text-enabled devices.

30. An interfacing method for a remote user input for reading a database, the method comprising:
  determining a connection type of a user, wherein said connection type is a voice-based, a text-based or a combined voice-text capable communication link,
  eliciting a remote input from a user via either one of voice and text based communication according to said connection type of the user;
  recognizing one of human speech and data input to said interface;
  formulating a searchable query from said recognized input;
  eliciting from said user further input to supplement original input in formulating the searchable query unless a query sufficient for searching said database has been formulated;
  and searching a database using the sufficient searchable said query.

31. An interfacing method according to claim 30, further comprising:
  determining whether an ambiguous answer is received from said database, and
  if an ambiguous answer is received, then eliciting a further input from a user so as to obtain an unambiguous answer from said database.

32. A method of remotely reading a database via a remote communication device having a communication mode, comprising:
  entering a query request via said remote communication device in said communication mode;
  sending said query request to a communication interface in said communication mode;
  receiving instructions in said communication mode for entering query items to form a database search query;
  sending said query items in said communication mode for said interface to form a query for interrogating said database in a database interrogation mode to produce a query result for translation by said interface into said communication mode, and
  receiving said result at said remote communication device from said interface in said communication mode, wherein when said query items are insufficient to form said query for interrogating said database, receiving additional instructions in said communication mode for entering additional query items to supplement the search query.

33. A method according to claim 32, wherein said communication mode is a mode of voice communication.

34. A method according to claim 33, wherein said database interrogation mode is phonemes communication mode.

35. A method according to claim 32, wherein said communication mode is of text communication mode.

36. A method according to claim 32, wherein said database interrogation mode is a text communication mode.

37. A method according to claim 32, wherein said database is interrogated based on a person's name.

* * * * *